July 22, 1952          N. L. DOLBEY          2,604,416

PROCESS FOR DAMPING MINERAL FIBERS TO BE SPRAYED IN AIR

Filed Sept. 30, 1947          4 Sheets-Sheet 1

*FIG. 1.*

Inventor:
Norman L. Dolbey,
by Thomas E. Scofield,
Attorney.

Inventor:—
Norman L. Dolbey,
by
Thomas E. Scofield,
Attorney.

July 22, 1952            N. L. DOLBEY            2,604,416

PROCESS FOR DAMPING MINERAL FIBERS TO BE SPRAYED IN AIR

Filed Sept. 30, 1947            4 Sheets—Sheet 3

Inventor
Norman L. Dolbey,
by Thomas E. Scofield,
Attorney.

July 22, 1952 N. L. DOLBEY 2,604,416
PROCESS FOR DAMPING MINERAL FIBERS TO BE SPRAYED IN AIR
Filed Sept. 30, 1947 4 Sheets-Sheet 4

FIG. 6.

Inventor:-
Norman L. Dolbey,
by
Thomas E. Scofield,
Attorney.

Patented July 22, 1952

2,604,416

UNITED STATES PATENT OFFICE 2,604,416

PROCESS FOR DAMPING MINERAL FIBERS TO BE SPRAYED IN AIR

Norman L. Dolbey, Armley, Leeds, England, assignor to J. W. Roberts Limited, Armley, Leeds, England, a British company Application September 30, 1947, Serial No. 776,964

4 Claims. (Cl. 117—100)

A very effective way of forming insulating coatings on walls, ceilings or other surfaces is to spray asbestos fibre with or without other material and with an adhesive or ingredients which react to form an adhesive.

This process can advantageously be carried out in the manner and with the apparatus described in United States Patents Nos. 1,990,584 and 1,990,585 issued to me on February 12, 1935, the fibre being suspended in air and then subjected to suction but when this is done there is one practical drawback. This drawback is that dust escapes into the atmosphere during the spraying operation and, in order to overcome it, many expedients have been tried. The drawback can be overcome by the method described in my United States application Serial No. 603,616, July 7, 1945, Patent No. 2,563,457 issued August 7, 1951, that is to say, by mixing the asbestos with a predetermined quantity of water or other damping material in such a way that in the course of the mixing substantially every particle of asbestos is damped and the damping material is so uniformly distributed throughout the asbestos that there is no tendency for particles to stick together by reason of different moisture contents. In my said application No. 603,616 I have also described apparatus by which this process can be carried out, this apparatus incorporating a rotary mixing drum adapted to carry the asbestos upwards as the drum rotates and a rotary brush mounted within the drum to engage the asbestos which is carried upwards and by a beating action to open up fibre bundles and fling the particles through the drum to fall to the bottom and be carried upwards again. Such an apparatus serves to treat batches of asbestos fibre. Now it is desirable to be able to work continuously, that is to say, to feed dry asbestos to an apparatus such as that shown in my Patents Nos. 1,990,584 and 1,990,585 and to spray it without having to damp the fibre in batches. An object of this invention is to enable asbestos or other mineral fibre, e. g. glass fibre, to be supplied in a current of air to a spraying device substantially free of dry and loose dust.

Another object of the invention is to provide improved means for damping asbestos or other fibres. As a result of many researches, I have found that the dust can be reduced to such an extent that the drawback of dust escaping into the atmosphere is largely overcome, although the formation and spraying of dust may not be completely eliminated. In the present invention I spray the fibre with water or other damping agent while it is travelling in a thin layer and before it is suspended in air, I control the damping in accordance with the flow of fibre, and in feeding the damped fibre particles into the air current I prevent suction being exerted to any substantial extent on such dust as is formed so that practically no such dust is drawn into the air current.

It is important that the damping should be as uniform as possible and for this reason the fibre should be spread out into a thin layer, that is to say, one thinner than is usual at the present time. The damping agent sprayed on to this layer may be water in atomised form, oil or any appropriate liquid. It is simplest to use water, and the water jet should be as fine as possible. In addition to damping the thin layer of fibre, such a jet also creates a fog-like atmosphere which tends to cause any dust formed to settle within the apparatus.

I prefer to effect the damping in a casing through which the thin layer travels and which is substantially closed, and it is an important feature that the interior of this casing is not in communication with any space under low pressure such that dust in suspension in the casing would be drawn out of it by suction.

In carrying out the process I prefer to employ an apparatus such as that shown in my Patents Nos. 1,990,584 and 1,990,585 with a conveyor belt to carry the fibre upwards past a brush which serves to remove all the fibre except the desired thin layer and to modify this apparatus by providing means for spraying atomised water onto the thin layer while it is still on the conveyor belt, the layer being removed from the belt by a stripping brush. The thinner the layer of fibre which is sprayed with the water the better the results, as the fibre and water become more uniformly mixed. It is possible to make the layer thinner without reducing the capacity of a given apparatus by increasing the speed of the conveyor and making the first brush approach the conveyor closely. I find it impossible to damp the fibre absolutely uniformly while it is on the conveyor and accordingly a little dust is produced by the action of the stripping brush and conveyed to the spraying device. However, this dust is relatively small in amount and to keep it to a minimum the speed of the stripping brush should be made as low as possible.

In the apparatus described in my Patents Nos. 1,990,584 and 1,990,585 the air into which the particles are projected is drawn into the suction inlet of a fan, so in effect the particles form a suspension in a moving current of air and this suspension is conveyed forward by the fan. In that apparatus it is the fan which produces the greatest part of the dust. In the present invention I may still use a fan but by the time the fibre arrives at the fan it is already sufficiently damped to prevent any appreciable formation of further dust in the fan.

So far as possible, no dust should be drawn forward with the fibre and, to this end, I prefer to modify the apparatus further. In the first place, when I employ a fan to convey the suspension forwards, I prefer to cause the fan to draw in air from the atmosphere so that the suction which it produces is not exerted to any substantial extent upon the interior of the casing. This result is preferably attained by splitting into two parts a duct through which the fibre falls from the stripping brush, the upper end of the lower part surrounding and overlapping the lower end of the upper part so as to leave a space through which air can be drawn in from the surrounding dust-free atmosphere.

Instead of causing the particles to pass through a fan I may entrain them in an air current which may itself be produced by a fan. For instance, the particles on being projected into air by a stripping brush may fall down a funnel-like duct to a continuously rotating valve of the star or gate type, through which the particles pass into a pipe in which the air current is flowing. Such a valve serves to break any suction which would otherwise be applied to the interior of the casing.

As stated above, the spraying of the damping agent must be controlled in synchronism with the movement of the fibre. In existing apparatus for spraying asbestos fibre, it is usual to provide a pneumatically operated clutch for the conveyor belt and to operate this by a device fixed to the spraying nozzle so that the belt is stopped whenever spraying is stopped. In the present invention the spray of atomised water, oil or other damping agent may be stopped simultaneously under the same control.

The preferred form of apparatus according to the invention will now be described by way of example with reference to the accompanying drawings in which:

Figure 1 is a somewhat diagrammatic elevation of the apparatus, partly in section;

Figure 3 is a central vertical section through the part of the apparatus shown in the upper right-hand part of Figure 1;

Figure 4 is an enlarged section on the line IV—IV in Figure 3; and

Figure 6 is a diagrammatic view of the mechanism for controlling the damping.

Figure 2:
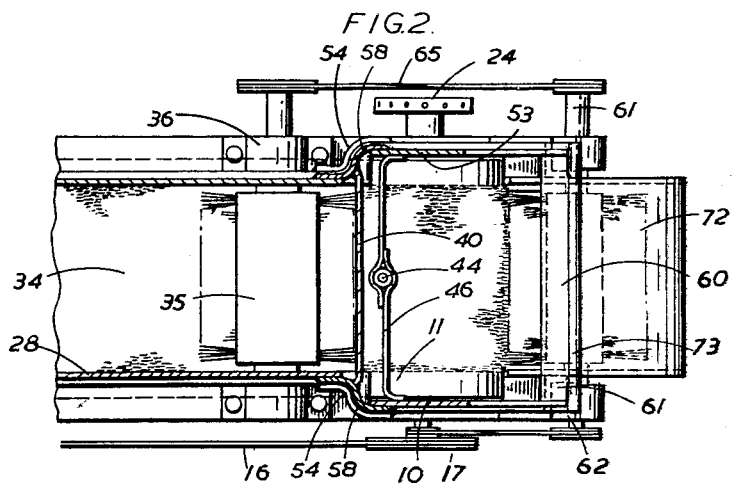
Figure 2 is a section on the line II—II in Figure 1.
Figure 5:
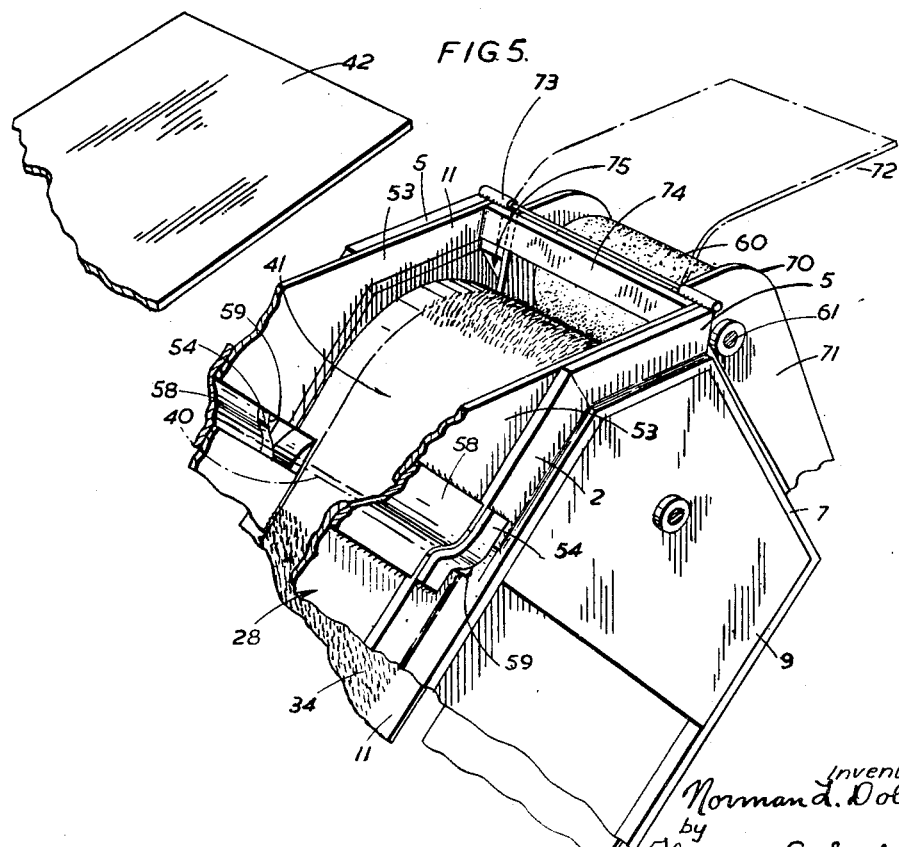
Figure 5 is a perspective view of part of the interior of the apparatus.

The apparatus is carried by an angle-iron framework having two side frames each composed of a base member 1, inclined side members 2 and 3, a vertical member 4, a top member 5, two members 6 and 6' spanning the members 2 and 3 and an inclined member 7 uniting the members 5, 3 and 4. The two side frames are united by cross-members (not shown) at the base and top. The space at each side between the members 2, 3, 5 and 7 is closed by cheek plates 8 and 9, the plate 8 at each side being of sheet metal and the plate 9 being a casting which serves as a main bearing for a drum 10. The drum forms the upper roller for an endless belt conveyor 11, which also passes over a roller 12 carried in bearings 13 supported by the members 6 and 6'. The conveyor 11 is driven by an electric motor 15 mounted on the base members 1, the motor being connected by a driving belt 16 to drive a wheel 17 keyed to a shaft 18 which passes through the drum 10. This shaft 18 is carried in bearing brushes within sleeves 19 and 19', which enter the drum (as shown in Figure 4) and which are themselves journalled in the bearing plates 9. The sleeve 19 is secured to a transverse annular plate 20 which is fixed inside the drum. The sleeve 19' is secured to the casing of a gear 21 of the epicyclic type, which is itself secured to another annular plate 22 fixed inside the drum. The gear 21 connects the shaft 18 and a shaft 23 to which a wheel 24 is keyed. This wheel has a series of holes 25 around its periphery and these can be engaged by a plunger 26 mounted to slide in a cylinder 27 fixed to the side of the apparatus. When the plunger enters one of the holes 25 the shaft 23 cannot rotate; in these circumstances the shaft 18 drives the drum 10 through the gear 21. If, however, the wheel 24 is free to rotate as a result of the withdrawal of the plunger 26 from the hole 25, the frictional resistance of the drum 10 and conveyor 11 causes the gear to drive the shaft 23 preferentially and the drum and conveyor stop.

Above the conveyor 11 there is a sheet metal hopper 28 which is kept charged with asbestos fibres and has a lid 31 hinged at 32 to a fixed cross-piece 38. Beneath the lower run of the conveyor there is a sheet metal plate 33 which spans the two side members 3.

The central part of the conveyor 11 carries a series of spikes 34 and on each side of these the belt is smooth and projects laterally beyond the hopper 28, so that in effect the bottom of the hopper is formed by the spiked part of the conveyor. When the conveyor is running the spikes 34 pick up asbestos and carry it upwards. It is important that only a thin uniform layer of asbestos should remain on the conveyor at the top of the upward run, and a brush 35 is provided to sweep over the conveyor and detach and return to the hopper any asbestos in excess of this thin layer. This brush is carried in bearings which are fixed to the frame members 2, the shaft of the brush passing through bushings in the side walls of the hopper.

The thin uniform layer of asbestos which is left on the conveyor by the brush 35 passes beneath a plate 40 which spans the interior of the hopper 28 and forms one wall of a damping chamber 41, the bottom of which is formed by the conveyor 11. The sides of this chamber are constituted by walls 53 which are offset from the walls of the hopper 28 and joined to them by curved walls 58. The chamber 41 is thus wider than the hopper 28 and in fact it is nearly the full width of the belt 11. Along the walls 53 the side members 2 are made narrower as shown in Figure 4, and the walls of the hopper 28 and 53 are united by cross parts 54 which stop short of the smooth edge surfaces of the conveyor 11. The result is to form openings 59 at each side of the chamber 41, these openings leading onto the members 2 outside the hopper 28. The top of the chamber 41 is constituted by a lid hinged at 43 to the cross-piece 38.

In the damping chamber 41 there is a spray nozzle 44 held between semi-circular parts 45 of two straps 46 which are welded together and to the side walls of the chamber 41. This nozzle 44 is fed with water through a pipe 47 and with compressed air through a pipe 48. It includes an orifice 49 which can be closed by a needle valve 50. When air is admitted through the pipe 48 it acts on the underside of a diaphragm 51 which is secured to the stem of the needle valve 50 and so moves the valve away from the orifice 49. At the same time the air passes through a narrow annular passage 52 to the orifice and atomises water flowing to the orifice from the pipe 47. The nozzle then delivers an atomised fan-shaped spray of water which when it strikes the conveyor is of the same width as the part covered by the spikes 34. The amount of water may, for example, be from 5 to 10% by weight of the asbestos. The spray damps the asbestos substantially uniformly and produces a moist atmosphere in the damping chamber 41.

As the conveyor begins its downward run the asbestos is removed by a stripping brush 60 which is mounted on a shaft 61 carried in bearing brackets 62 which are fixed to the frame members 7. This shaft 61 is driven by a belt 64 from the shaft 18 and in turn it drives the shaft of the brush 35 through a belt 65.

The brush 60 works in, and in effect constitutes a wall of, a chamber 70 having side walls 71 aligned with the side walls of the hopper 28 and secured to the members 7. This chamber 70 is closed by a curved lid 72 hinged at 73 and it is narrower than the chamber 41. Where the two chambers meet there is a cross-plate 74 which stops short of the smooth edges of the conveyor and leaves openings 75 through which any material on the smooth edges can pass.

The chamber 70 in turn merges into the top of a chute 76 into which the particles of asbestos detached by the brush 60 fall. This chute has side walls 77 which overlap the lower part of the brush 60, a wall 78 which nearly touches the spikes 34 on the conveyor 11 and a wall 79 which extends far enough upwards to form an abutment for the lower edge of the lid 72.

The chute 76 is continued as the first half 80 of a two-part duct, the second part of which, 81, has an outlet registering with the suction inlet of a fan 82 mounted to rotate about a horizontal axis. This fan is driven through a belt 83 by the motor 15. It receives the particles of asbestos which fall down the duct and delivers them through a pipe 84 to a spraying device 85. From this device the asbestos is sprayed at the same time as an emulsion of rubber in water which is supplied to the device through a pipe 86, the asbestos and emulsion being projected onto a wall or other surface to be coated. The emulsion is sprayed and atomised under the action of compressed air delivered through a pipe 87 and it acts as an adhesive for the asbestos.

It will be observed that the lower end of the part 80 of the duct lies wholly within the mouth of the part 81, which is itself surrounded by a hood 90 so as to leave an annular opening 91 through which the air can be drawn in. By using such a broken duct the suction exerted by the fan is applied substantially entirely to the atmospheric air through the opening 91.

It will be seen that in the apparatus shown the asbestos travels through a substantially closed casing which is divided into (or constituted by) the hopper and the chambers 41 and 70. It is inevitable that some dust will be formed within this casing, if only because of the high speed at which the brush 35 must rotate and the consequent fan-like effect it produces. The purpose of the invention is to reduce to a minimum the amount of dust delivered to the spraying device 85, and the apparatus shown in Figure 1 can if necessary be put where dust escaping from it is not deleterious. However any dust produced in the hopper 28 will in the main stay in the hopper. Dust directly produced by the brush 35 is for the most part directed into the hopper. Dust in the damping chamber 41 will either stay in suspension or become damped by the moisture in the atmosphere. So long as it is in suspension in the chamber it is harmless. Once it has become damp enough to fall out of the suspension it is no longer harmful dust but rather damp particles of asbestos which can be allowed to fall to the ground to be swept up later if they pass out through the openings 59 or 75. The layer of asbestos is not lifted from the conveyor until it has been damped, so only little dust is produced by the stripping brush 60. As the part of the chamber 70 below the brush 60 is not under low pressure, there is no tendency for dust to be drawn in and past the brush 60 from any part of the interior of the casing by suction. Instead the brush merely detaches damp fibre from the conveyor and conveys onwards damp particles which are already falling in the upper part of the chamber 70 and which, because they are falling, are not harmful dust.

The compressed air supplied to the nozzle 44 is small in volume. It is supplied under a pressure of, say 30 lbs. per square inch and it sets up very little pressure in the damping chamber 41. Even this pressure is largely relieved beneath the lower edge of the plate 40, and the turbulence in the damping chamber is actually advantageous in maintaining dust in suspension until it is damp enough to fall down onto the conveyor.

The provision of the smooth edges of the conveyor belt 11 allows the wetting spray to cover the fibre adequately, without impinging directly on the side plates 53. In time the side plates 53 become damp and when a certain degree of dampness is reached there is a tendency for small portions of air-borne fibre to cling to the damp surfaces and build up as clots. When these small clots become overwetted they fall onto the smooth edges of the belt 11 and roll back down these smooth edges and out through the openings 59.

Thus it will be seen that the interior of the casing is substantially closed and not subjected to suction, so that very little dust escapes from it and the fibre conveyed to the spraying device is substantially dust-free.

The operator controls the whole operation through a single operating handle 95 which is connected to a double valve which controls the flow in both the pipes 86 and 87. A pipe 96 branches from the pipe 86 and runs to the cylinder 27. This contains a piston 98 which is moved against a spring 99 when air is allowed to flow in the pipe 96 and which carries the plunger 26. As a result, whenever the handle 95 is turned to stop the spraying of the asbestos the plunger 26 is withdrawn, the wheel 24 turns and the belt is stopped.

The pipe 48 runs from the cylinder 27 to the nozzle 44, and whenever the conveyor is stopped the supply of air to the nozzle 44 is also stopped. The water spray is then stopped because the diaphragm 51 moves the needle valve 50 to close the orifice 49.

I claim:
1. In a process for delivering loose mineral fibers to a spraying device having a high velocity air stream, the steps of arranging the mineral fibers into a relatively thin, flat layer on a movable supporting surface, advancing said layer continuously by moving the surface, dampening said fibers with an atomized liquid as the layer advances, substantially separating the dampened fibers from each other as the layer advances and simultaneously scattering said separated fibers into the upper part of an enclosed air space which is opened at its lower end and which has intermediate its upper and lower ends a restricted opening to the atmosphere, establishing a downwardly flowing current of air in the lower part of said air space by creating a partial vacuum at the lower end thereof, whereby as said separated fibers fall through the upper part of said air space and into the flowing current of air in the lower part of the air space they are forcibly delivered by said current of air into the high velocity air stream of the spraying device.

2. A process as set forth in claim 1 and in which the mineral fibers are asbestos.

3. In a process for delivering loose mineral fibers to a spraying device having a high velocity air stream, the steps of arranging the mineral fibers into a relatively thin, flat layer on a movable supporting surface which leads into the top of an enclosed air space which is open at its lower end and has a restricted air inlet intermediate its upper and lower ends, advancing said layer progressively into said air space by moving said surface, dampening said fibers while on said surface with an atomized liquid as said surface advances, substantially separating the dampened fibers from each other as they are received into said air space and simultaneously scattering and projecting said separated fibers in the upper part of said air space, establishing a current of air flowing downwardly from said intermediate air inlet to the open lower end of said air space by creating a partial vacuum at said lower end, whereby as said separated fibers fall through the upper part of said air space and into the flowing current of air in the lower part of said air space the fibers are forcibly delivered by said current of air into the high velocity air stream of the spraying device.

4. A process as set forth in claim 3 and which includes the step of maintaining said partial vacuum at the lower end of said air space of such low intensity that substantially no air or dust is drawn from that part of the enclosed air space which is above said intermediate air inlet.

NORMAN L. DOLBEY.

REFERENCES CITED

The following references are of record in the file of this patent:

UNITED STATES PATENTS

| Number | Name | Date |
|---|---|---|
| 1,672,539 | Novak | June 5, 1928 |
| 1,718,507 | Wenzel et al. | June 25, 1929 |
| 1,870,094 | Carlin | Aug. 2, 1932 |
| 1,990,584 | Dolbey | Feb. 12, 1935 |
| 2,438,471 | Ball | Mar. 23, 1948 |

FOREIGN PATENTS

| Number | Country | Date |
|---|---|---|
| 388,924 | Great Britain | Mar. 9, 1933 |